United States Patent
Popovski et al.

(10) Patent No.: US 7,920,825 B2
(45) Date of Patent: Apr. 5, 2011

(54) METHOD AND APPARATUS FOR TRANSMITTING AND RECEIVING DATA USING MULTI-USER SUPERPOSITION CODING IN A WIRELESS RELAY SYSTEM

(75) Inventors: Petar Popovski, Aalborg (DK);
Elisabeth de Carvalho, Aalborg (DK);
Kathiravetpillai Sivanesan, Suwon-si (KR); Eun-Taek Lim, Suwon-si (KR);
Ho-Kyu Choi, Seongnam-si (KR);
Young-Kwon Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 547 days.

(21) Appl. No.: 12/049,577

(22) Filed: Mar. 17, 2008

(65) Prior Publication Data
US 2008/0227388 A1    Sep. 18, 2008

(30) Foreign Application Priority Data
Mar. 16, 2007  (KR) ................ 10-2007-0026114

(51) Int. Cl.
*H04B 7/15* (2006.01)
(52) U.S. Cl. ............... 455/11.1; 455/13.1; 455/552.1; 370/315; 370/342
(58) Field of Classification Search ............ 455/11.1, 455/13.1, 16, 17, 21, 46, 552.1, 571, 215, 455/452.2, 450, 446, 561, 550.1, 453; 370/315, 370/329, 342; 375/315
See application file for complete search history.

(56) References Cited

U.S. PATENT DOCUMENTS

| | | | |
|---|---|---|---|
| 7,464,166 B2 | 12/2008 | Larsson et al. | |
| 7,706,456 B2 | 4/2010 | Laroia et al. | |
| 2006/0171347 A1* | 8/2006 | Attar et al. | 370/328 |
| 2007/0155395 A1* | 7/2007 | Gopalakrishnan et al. | 455/453 |
| 2007/0250638 A1* | 10/2007 | Kiran et al. | 709/236 |
| 2008/0175183 A1* | 7/2008 | Devroye et al. | 370/315 |
| 2008/0273512 A1* | 11/2008 | Attar et al. | 370/342 |

FOREIGN PATENT DOCUMENTS

| | | |
|---|---|---|
| KR | 1020060002771 | 1/2006 |
| KR | 1020060004935 | 1/2006 |
| WO | WO 2005/043844 | 5/2005 |
| WO | WO 2007/014021 | 2/2007 |

* cited by examiner

*Primary Examiner* — Tan Trinh
(74) *Attorney, Agent, or Firm* — The Farrell Law Firm, P.C.

(57) ABSTRACT

A method and apparatus for joint unicast using multi-user superposition coding in a wireless relay system are provided. A BS superposition-encodes first and second data messages directed to first and second MSs, respectively, scheduled at a current scheduling instant. The first and second data messages carry first and second information bit streams for the first and second MSs, respectively. The first MS has a relatively good direct link to the BS, and the second MS has a relatively bad direct link to the BS. The superposition-coded data is transmitted to the first MS and an RS connected between the BS and the first and second MSs. The RS receives the superposition-coded data from the BS, extracts the second information bit stream by decoding the superposition-coded data, and transmits a third data message carrying the second information bit stream to the first and second MSs.

21 Claims, 9 Drawing Sheets

METHOD AND APPARATUS FOR TRANSMITTING AND RECEIVING DATA USING MULTI-USER SUPERPOSITION CODING IN A WIRELESS RELAY SYSTEM

PRIORITY

This application claims priority under 35 U.S.C. §119(a) of a Korean Patent Application filed in the Korean Intellectual Property Office on Mar. 16, 2007 and assigned Serial No. 2007-26114, the entire disclosure of which is incorporated herein by reference.

BACKGROUND OF THE INVENTION

1. Field of the Invention

The present invention generally relates to data transmission and reception in a wireless relay system, and more particularly, to a method and apparatus for joint unicast using Multi-User Superposition (MUS) coding.

2. Description of the Related Art

One active research area of a future generation communication system, such as the $4^{th}$ Generation (4G) communication system, involves providing a large amount of data with various Quality of Service (QoS) requirements at high rates to users. To enable high-speed communications, the 4G communication system uses cells having very small radii. This means that a conventional centralized wireless network designing scheme is not viable for implementation of the system. In this context, there is a need for a wireless network design that supports distributed control and actively copes with changes in a cell environment such as additional installations of Base Stations (BSs). Hence, a self-configurable wireless network is required which autonomously configures a wireless network without control of a central system in a distributed fashion to provide communication services.

Techniques used for an ad hoc network should be adopted to deploy the self-configurable network in the 4G communication system. A major ad hoc network is a multi-hop relay cellular network realized by employing a multi-hop relay scheme to a cellular network system including fixed BSs. Typically, the BSs are fixed in position in the cellular network. The resulting less flexibility in configuring a wireless network makes it impossible to provide efficient communication services in a wireless environment experiencing fluctuating changes in traffic distribution or the number of required calls.

In the 4G communication system, to avert this problem, the self-configuration wireless network uses a relay scheme in which data is delivered over multiple hops through a plurality of neighboring Mobile Stations (MSs) and fixed Relay Stations (RSs), to thereby enable fast network reconfiguration according to environmental changes and enable efficient operation of the overall wireless network.

The multi-hop relay wireless network offers the benefits of cell coverage expansion and increased system capacity. When the channel status between a fixed BS and an MS is poor, a multi-hop link is established between them via an RS so that a better radio channel is provided to the MS. Efficient communication services can be provided, especially in a shadowing area with a severe shielding effect caused by buildings.

The RS-based wireless relay system needs to transmit data from a BS to an intended MS efficiently on the downlink. There exists a need for a technique for increasing overall communication efficiency, especially when the BS serves a plurality of MSs and an RS assists downlink transmissions for MSs having poor direct links to the BS.

SUMMARY OF THE INVENTION

The present invention has been made to address at least the above problems and/or disadvantages and to provide at least the advantages described below. Accordingly, an aspect of the present invention provides a method and apparatus for joint-unicasting data to multiple users using superposition coding in a wireless relay system.

Another aspect of the present invention provides a method and apparatus for transmitting data sets directed to different users by superposition coding from a BS in a wireless relay system.

A further aspect of the present invention provides a method and apparatus for establishing a multi-hop link between a BS and an MS via an RS in addition to a direct link between them in a wireless relay system.

According to one aspect of the present invention, a method for transmitting data via an RS in a wireless relay system is provided. A BS encodes a first data message and a second data message directed to a first MS and a second MS scheduled at a current scheduling instant by superposition coding. The first data message carries a first information bit stream for the first MS. The second data message carries a second information bit stream for the second MS. The first MS has a relatively good direct link to the BS, and the second MS has a relatively bad direct link to the BS. The superposition-coded data is transmitted to the first MS and an RS connected between the BS and the first and second MSs by the BS. The RS receives the superposition-coded data from the BS, extracts the second information bit stream for the second MS by decoding the superposition-coded data, and transmits a third data message carrying the second information bit stream to the first and second MSs.

According to another aspect of the present invention, a method for receiving data via an RS in a wireless relay system is provided. A first MS receives superposition-coded data including a first data message carrying a first information bit stream for the first MS and a second data message carrying a second information bit stream for the second MS. The first MS has a relatively good direct link to a BS, which is scheduled along with the second MS having a relatively bad direct link to the BS at a current scheduling instant by a BS. A third data message carrying the second information bit stream directed to the second MS is received from an RS connected between the BS and the first and second MSs. The second information bit stream is extracted by decoding the third data message. The first data message is acquired by removing components related to the second information bit stream from the superposition-coded data. The first information bit stream is extracted by decoding the first data message.

According to a further aspect of the present invention, an apparatus for transmitting and receiving data via an RS in a wireless relay system is provided. A BS superposition-encodes a first data message carrying a first information bit stream for a first MS and a second data message carrying a second information bit stream for a second MS having a relatively bad direct link to the BS. The first and second MSs are scheduled at a current scheduling instant. The superposition-coded data is transmitted. An RS connected between the BS and the first and second MSs establishes multi-hop links, receives the superposition-coded data from the BS, extracts the second information bit stream for the second MS by decoding the superposition-coded data, and transmits a third data message carrying the second information bit stream to the first and second MSs. Herein, the first MS receives the superposition-coded data from the BS, receives the third data message from the RS, extracts the second information bit stream by decoding the third data message, acquires the first data message by removing components related to the second information bit stream from the superposition-coded data, and extracts the first information bit stream by decoding the first data message.

BRIEF DESCRIPTION OF THE DRAWINGS

The above and other objects, features and advantages of the present invention will be more apparent from the following detailed description when taken in conjunction with the accompanying drawings, in which.

DETAILED DESCRIPTION OF PREFERRED EMBODIMENTS

Preferred embodiments of the present invention are described in detail with reference to the accompanying drawings. It should be noted that similar components are designated by similar reference numerals although they are illustrated in different drawings. Detailed descriptions of constructions or processes known in the art may be omitted to avoid obscuring the subject matter of the present invention.

The embodiments of the present invention efficiently transmit downlink data from a BS to MSs using superposition coding in a wireless relay system having an RS between the BS and the MSs.

The wireless relay system uses a plurality of RSs in order to increase service coverage and system throughput and reduce communication delay. When the BS serves multiple MSs, an RS assists downlink transmissions from the BS for some users, which in general have poor links to the BS. If an MS has a good direct link to the BS, then the RS is not needed for the MS. A good link refers to a link having a Signal-to-Noise Ratio (SNR) that ensures an error rate equal to or below a required threshold when a user receives data. In the case where the direct link of an MS is of intermediate quality, the MS makes an effective choice between the link to the BS and the link to the RS. For such an intermediate case, a relaying method based on superposition coding is used to increase spectral efficiency.

In a multi-user system, transmission resources are usually time, frequencies, or codes. As data is transmitted simultaneously to a plurality of receivers in the same transmission resources or as a plurality of transmitters transmit data simultaneously in the same transmission resources, system capacity can be significantly increased. For this simultaneous information transmission in the same transmission resources, superposition coding is used.

According to the embodiments of the present invention, superposition coding is used for downlink transmission in a wireless relay system using RSs. When a direct link is impossible between a BS and an MS due to factors such as shadowing, the BS and the MS are connected via an RS. A plurality of RSs can be used depending on the number of MSs served by the BS.

Figure 1:
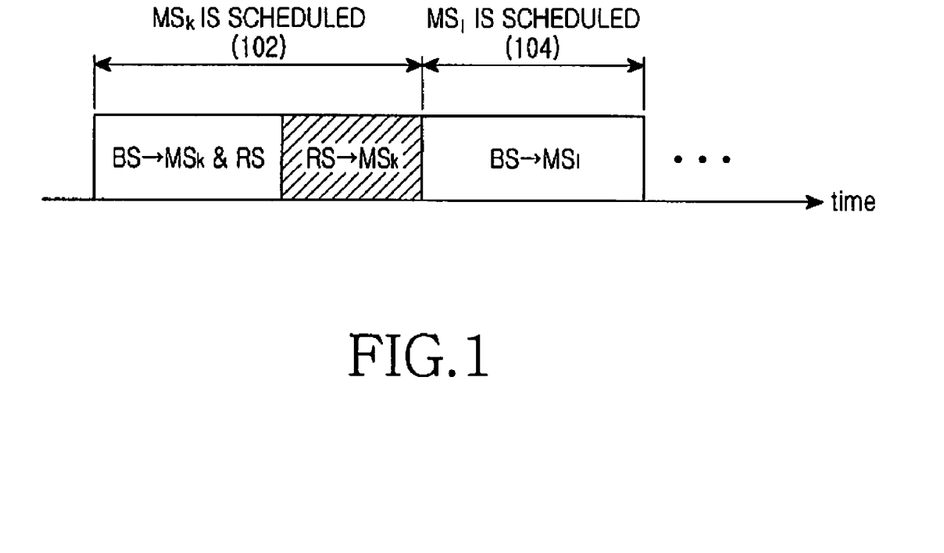
FIG. 1 is a diagram illustrating RS-assisted scheduling and transmission in a cellular system according to an embodiment of the present invention.

FIG. 1 illustrates RS-assisted scheduling and transmission in a cellular system according to an embodiment of the present invention. In the illustrated case of FIG. 1, a BS serves only a single user on a single channel at each scheduling instant. This channel is used in a time-division manner by the BS and an RS.

Referring to FIG. 1, the BS selects a single MS, $MS_k$ or $MS_1$ according to some criteria, for example, maximal throughput, maximal proportional fairness, etc. at each of first and second scheduling instants 102 and 104 and transmits data to the selected MS either directly or with the help of the RS. If the RS needs to assist the downlink transmission, it transmits data to $MS_k$ immediately after data transmission from the BS to the RS and $MS_k$, for example at the first scheduling instant 102.

The BS selects a pair of MSs, for example $MS_i$ and $MS_j$ in a certain scheduling epoch and transmits data to them jointly by superposition coding. Notably, the scheduling epoch features simultaneous unicast to both MSs, rather than broadcast to them. That is, each user receives different data from the jointly transmitted data and completely different scheduling algorithms can be used for the two users. Obviously, the Multi-User Superpositioning (MUS) of the present invention is applicable to the case where one or more users are selected per channel. For convenience sake, the case where two users exist is considered herein. Although many classes of scheduling algorithms can be used for the present invention, embodiments of the present invention will be described based on a standard scheduling algorithm.

Figure 2:
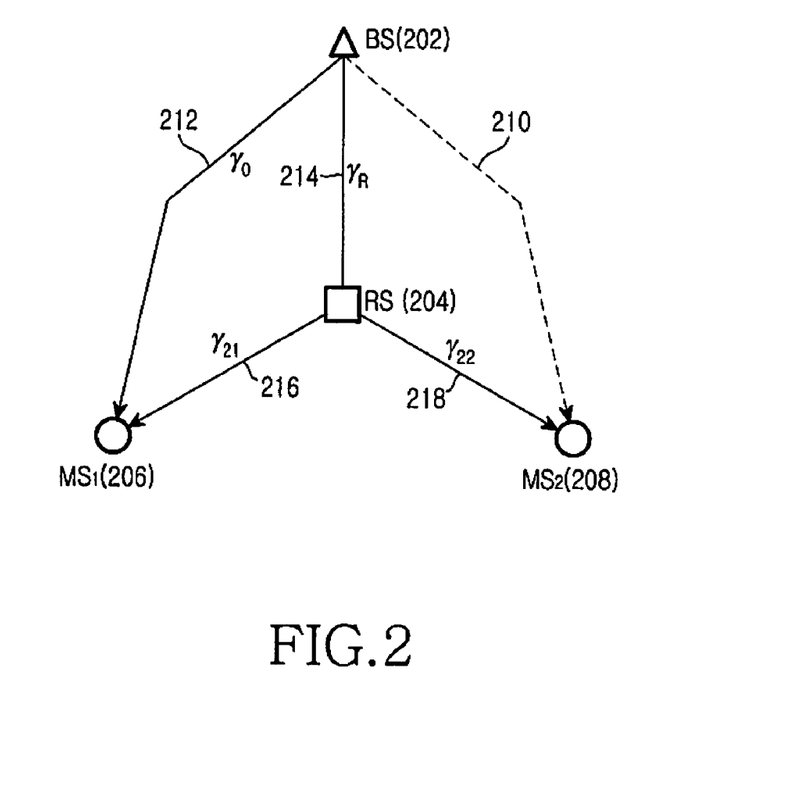
FIG. 2 is a diagram illustrating a downlink transmission scenario according to an embodiment of the present invention.

FIG. 2 illustrates a downlink transmission scenario according to an embodiment of the present invention.

Referring to FIG. 2, a BS 202 supports downlink transmission to both users, $MS_1$ 206 and $MS_2$ 208. The link 214 between the BS 202 and an RS 204 has a very high and stable SNR denoted by $\gamma_R$ [dB]. $MS_1$ has a good direct link 212 to the BS 202, with an SNR equal to $\gamma_0$. Although $MS_1$ is served via the direct link 212, it also has a good direct link 216 to the RS 204 with an SNR of $\gamma_{21}$.

$MS_2$ has a bad direct link 210 to the BS 202 due to shadowing, for example. So it needs to be supported by the RS 204 in order to receive downlink transmissions from the BS 202. The RS 204 has a direct link 218 to $MS_2$ 208, with an SNR of $\gamma_{22}$. For instance, if the SNR of the direct link 218, $\gamma_{22}$ is lower than a minimum SNR (i.e. threshold) required for data reception from the BS 202, the direct link 218 is determined to be bad.

Relaying with superposition coding brings an increased spectral efficiency for $MS_1$ under the condition of Equation (1):

$$\gamma_{21} \geq \gamma_0 \qquad (1)$$

However, the increase in spectral efficiency is not significant if $\gamma_{21}$ is close to $\gamma_0$. In an embodiment of the present invention described later, an MUS scheme is proposed which can gain an increase in the spectral efficiency or a wide range of values $\gamma_{21}$. The MUS scheme is divided into two steps.

In Step 1, during a time of N symbols, i.e. an N -symbol duration, the BS 202 transmits the following superposition-coded data according to Equation (2):

$$\sqrt{1-\alpha}X_1+\sqrt{\alpha}X_2, \quad 0\leq\alpha\leq 1 \qquad (2)$$

where $X_1$ denotes an N-symbol message carrying $D_1$ information bits for $MS_1$ 206, $X_2$ denotes an N-symbol message carrying $D_2$ information bits for $MS_2$ 208, and $\alpha$ is a coefficient appropriately selected between 0 and 1. For the RS 204 to be able to decode both messages, the following restrictions are put to the transmission rates $R_1$ and $R_2$ of the messages $X_1$ and $X_2$., shown in Equation (3):

$$R_1 \leq \log_2\left(1+\frac{(1-\alpha)\gamma_R}{1+\alpha\gamma_R}\right) \quad R_2 \leq \log_2(1+\alpha\gamma_R) \qquad (3)$$

Via the direct link 212 from the BS 202, $MS_1$ 206 receives the signal as shown in Equation (4):

$$\gamma_{11}=h_0(\sqrt{1-\alpha}X_1+\sqrt{\alpha}X_2)+z_{11} \qquad (4)$$

where $h_0$ denotes a channel impulse response representing the channel characteristics between $MS_1$ 206 and the BS 202 and $z_{11}$ denotes other signals (e.g. noise) introduced to $MS_1$ 206. Then $MS_1$ 206 waits for Step 2, i.e. transmission of the RS 204. On the other hand, having the bad direct link 210 to the BS 202, $MS_2$ 208 completely ignores the transmission from the BS 202.

In Step 2, during M symbols following to the N symbols of Step 1, i.e. during the next M-symbol duration, the RS 204 transmits a message $X_3$ carrying the $D_2$ information bits for $MS_2$ 208 at a rate $R_{s2}$, according to Equation (5):

$$R_{s2}\leq\log_2(1+\min(\gamma_{21},\gamma_{22})) \qquad (5)$$

so that both $MS_1$ 206 and $MS_2$ 208 are able to receive it from the RS 204 and decode it. For easier notation, as shown in Equation (6):

$$\gamma_2=\min(\gamma_{21},\gamma_{22}) \qquad (6)$$

To use maximal possible rates in Step 1 and Step 2, the following relationship of Equation (7) should be placed $$R_2N = R_{s2}M \Leftrightarrow M = N\frac{\log_2(1+\alpha\gamma_R)}{\log_2(1+\gamma_2)} \qquad (7)$$

After the transmission of the RS 204, $MS_2$ 208 decodes the intended unicast message X of $D_2$ bits. $MS_1$ 206 also decodes the message X, creates the $D_2$ bits intended for $MS_2$ 208 out of that message X, and reconstructs the message $X_2$ using the $D_2$ information bits. Then $MS_1$ 206 acquires the message $X_1$ by subtracting the components of the message $X_2$ from the received signal described as Equation (4) according to the following equation. Thus, $MS_1$ 206 achieves the intended $D_1$ information bits by decoding the message $X_1$., according to Equation (8):

$$\gamma_{12}=\gamma_{11}-h_0\sqrt{\alpha}X_2=h_0\sqrt{1-\alpha}X_1+z_{11} \qquad (8)$$

The transmission rate $R_1$ of the message $X_1$ satisfies the condition of Equation (9):

$$R_1 \leq \log_2(1+(1-\alpha)\gamma_0), \quad \gamma_0 = \frac{|h_0|^2}{\sigma^2} \qquad (9)$$

where $\sigma^2$ denotes Gaussian noise power. Equation (3) describes the transmission rates of the messages $X_1$ and $X_2$ received in combination at the RS 204 and Equation (9) describes the transmission rate of data received at $MS_1$ 206 after interference cancellation.

Hence, the total transmission rate of this system can be calculated as shown in Equation (10):

$$R_{MUS} = \frac{N(R_1+R_2)}{N+M} = \frac{R_1+R_2}{1+\frac{R_2}{R_{s2}}} \qquad (10)$$

Figure 3:
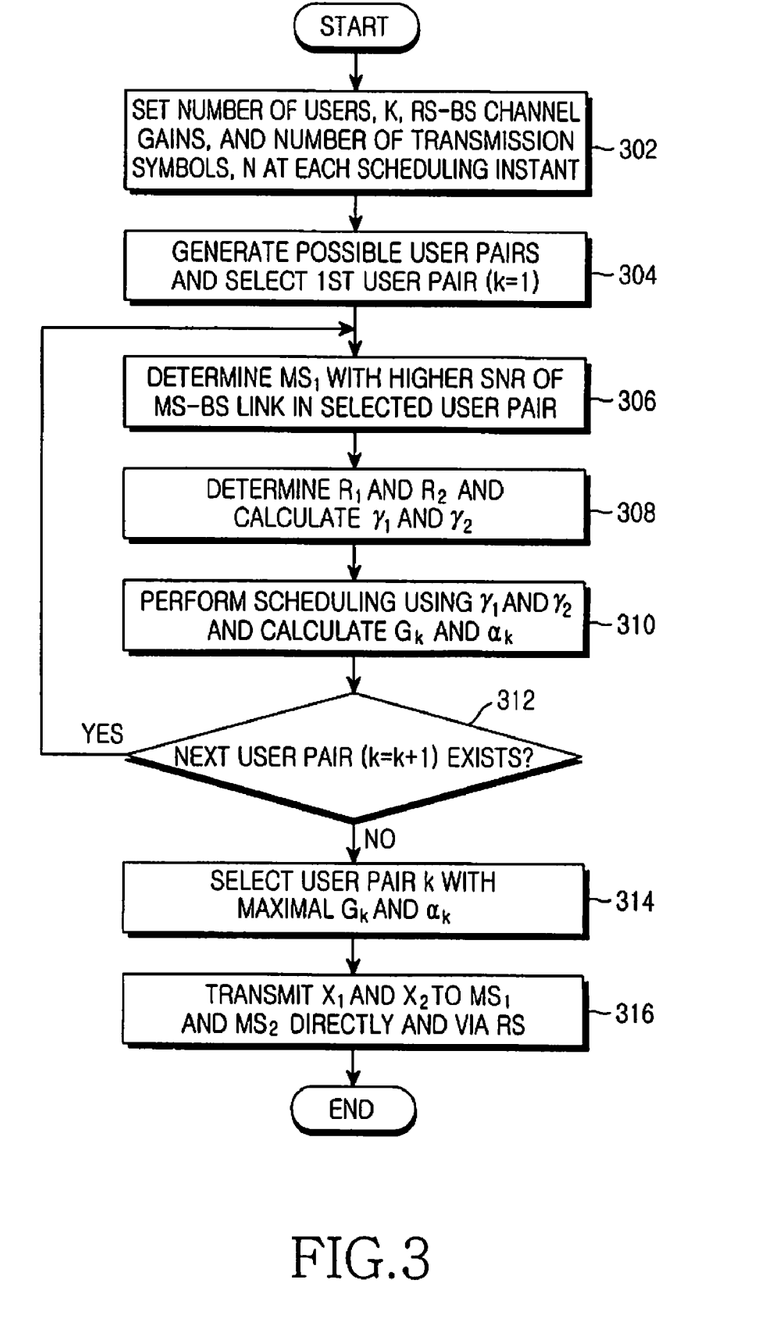
FIG. 3 is a flowchart illustrating a joint unicast operation according to an embodiment of the present invention.

FIG. 3 is a flowchart illustrating a joint unicast operation according to an embodiment of the present invention. Steps 302 through 314 can be performed by the BS or by another network node above the BS. For convenience' sake, it will be described that these steps are performed in the BS.

Referring to FIG. 3, the BS acquires given parameters, i.e. the number of users to be served, K and SNRs representing the channel gains of the RS and the BS with respect to the individual users in step 302. K is equal to the number of MSs that intend to receive data within the service area of the BS and the SNRs are obtained from channel state information measured and reported to the BS in measurement reports by the MSs. Also, the BS sets the number of transmission symbols, N, that it will use at each scheduling instant.

In step 304, the BS generates all possible user pairs associated with the K users and selects a first user pair k (k=1). Herein, $$1 \leq k \leq \frac{K(K-1)}{2}.$$

Let the MS having the higher SNR of a BS-RS link be denoted by $MS_1$ and the other MS be denoted by $MS_2$. Then, the BS checks the SNR between each MS and the RS in step 306. Specifically, the $MS_1$-RS link has an SNR of $\gamma_{21}$ and the $MS_2$-RS link has an SNR of $\gamma_{22}$. The smaller SNR between them is denoted by $\gamma_2$. As stated before, the BS-RS SNR is $\gamma_R$.

In step 308, the BS calculates the transmission rates $R_1$ and $R_2$ for $MS_1$ and $MS_2$ with respect to the given coefficient $\alpha$ in Step 1 according to Equation (11):

$$R_1=\log_2(1+(1-\alpha)\gamma_0)$$

$$R_2=\log_2(1+\alpha\gamma_R) \qquad (11)$$

Then, the BS calculates overall rates $r_1$ and $r_2$ for $MS_1$ and $MS_2$ at the scheduling instant by Equation (12). Note that the sum of $r_1$ and $r_2$ is equal to $R_{MUS}$ described in Equation (10).

$$r_1 = \frac{\log_2(1+(1-\alpha)\gamma_0)}{1+\frac{\log_2(1+\alpha\gamma_R)}{\log_2(1+\gamma_2)}} \qquad (12)$$

$$r_2 = \frac{\log_2(1+\alpha\gamma_R)}{1+\frac{\log_2(1+\alpha\gamma_R)}{\log_2(1+\gamma_2)}}$$

The BS decides an overall scheduling objective function for the scheduling instant using the overall rates $r_1$ and $r_2$ by a known scheduling algorithm in step 310. The overall scheduling objective function depends on the used scheduling algorithm. It outputs a scheduling gain for the input of the overall rates $r_1$ and $r_2$ and when needed, other parameters according to the scheduling algorithm. For example, the scheduling algorithm can use proportional fairness measurements as a criterion. Then the BS determines a coefficient $\alpha_k$ maximizing the scheduling gain for the user pair k and determines a scheduling gain $G_k$ corresponding to the coefficient $\alpha_k$.

If the next user pair remains in step 312, the BS selects the next user pair k (k=k+1) and returns to step 306. In the absence of the next user pair, the BS selects a user pair k having a maximal $G_k$ and a coefficient $\alpha_k$ corresponding to the maximal $G_k$ in step 314 and transmits data to the selected user pair in step 316. The specific operation of step 316 is described in FIG. 4.

Figure 4:
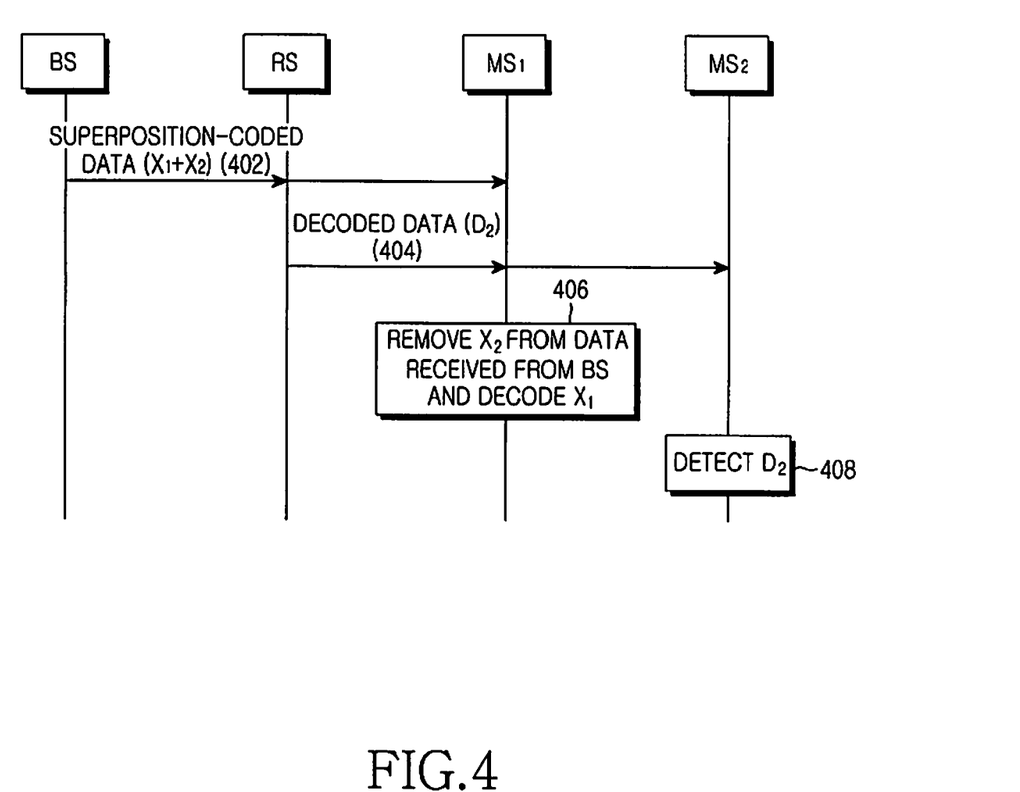
FIG. 4 is a diagram illustrating a message flow for an operation among a BS, an RS and MSs, according to an embodiment of the present invention.

Referring to FIG. 4, the BS transmits a message $X_1$ of N symbols carrying information bits for $MS_1$ and a message $X_2$ of N symbols carrying information bits for $MS_2$ using the coefficient $\alpha_k$ selected in step 314 of FIG. 3 by superposition coding described in Equation (2) in step 402. The message $X_1$ includes $NR_1=D_1$ information bits according to the transmission rate $R_1$ calculated in step 308 and the message $X_2$ includes $NR_2=D_2$ information bits according to the transmission rate $R_2$ calculated in step 308. The superposition-coded data is delivered to $MS_1$ having a good direct link to the BS.

In step 404, the RS acquires the two messages $X_1$ and $X_2$ by decoding the superposition-coded data and transmits the $D_2$ information bits extracted from the message $X_2$ in M transmission symbols at the transmission rate $R_{s2}$ calculated by Equation (5). $R_{s2}$ and M are computed by Equation (13) below. Both $MS_1$ and $MS_2$ are able to receive the data from the RS.

$$R_{s2} = \log_2(1+\gamma_2) \quad (13)$$
$$M = \frac{D_2}{\log_2(1+\gamma_2)}$$

In step 406, $MS_1$ receives the superposition-coded data from the BS and the data from the RS, acquires the message $X_1$ by subtracting the components of the message $X_2$ from the superposition-coded data referring to the $D_2$ information bits resulting from decoding the data received from the RS, and then achieves the intended $D_1$ information bits by decoding the message $X_1$.

Now a description will be made of the performances of the MUS scheme according to the embodiment of the present invention in many scenarios. In the following description, a conventional scheduling strategy is considered.

Figure 5:
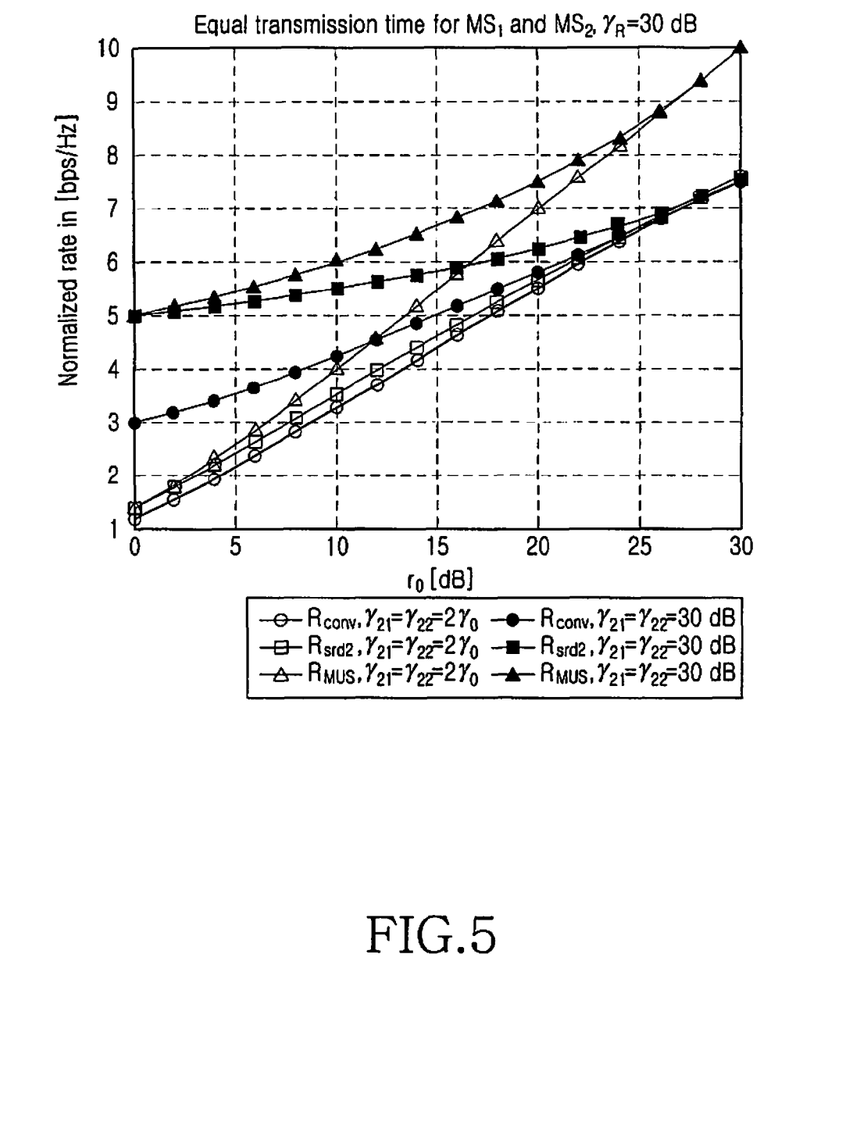
FIGS. 5 and 6 are graphs comparing the present invention with conventional methods in communication performance, when equal time resources are allocated to two MSs.

FIG. 5 is a graph comparing the present invention with conventional methods in communication performance expressed as normalized rates, when equal time resources are allocated to two MSs.

The two MSs, $MS_1$ and $MS_2$, can use $N_1$ transmission symbols, respectively. The BS transmits information bits in $N_1$ transmission symbols directly to $MS_1$ and in $N_1$ transmission symbols to $MS_2$ via the RS. Specifically, for a duration of $N_1$ transmission symbols, the BS transmits the information bits for $MS_1$ at a rate shown in Equation (14):

$$R_{c1}=\log_2(1+\gamma_0) \quad (14)$$

For a duration of $N_1$ symbols, the BS and the RS transmit the information bits to $MS_2$ in a multi-hop manner at a rate shown in Equation (15):

$$R_{c2} = \frac{\log_2(1+\gamma_R)\log_2(1+\gamma_{22})}{\log_2(1+\gamma_R)+\log_2(1+\gamma_{22})} \quad (15)$$

For a conventional method without superposition coding, the overall data rate is given by Equation (16):

$$R_{conv} = \frac{R_{c1}+R_{c2}}{2} \quad (16)$$

When the $N_1$ symbols are transmitted to $MS_1$, another conventional method achieves a transmission rate $R_{srd2}$ as shown in Equation (17):

$$R_{srd2} = \frac{\log_2(1+\gamma_R)\log_2(1+\gamma_{22})}{\log_2\left(\frac{\gamma_R}{\gamma_0}\right)+\log_2(1+\gamma_{22})} \quad (17)$$

where srd represents source, relay, and destination.

The present invention uses the MUS scheme for 2N, symbols and its overall transmission rate is determined by using Equation (10). For the MUS scheme, the coefficient $\alpha$ is computed by Equation (18):

$$\frac{(1-\alpha)\gamma_R}{1+\alpha\gamma_R} = (1-\alpha)\gamma_0 \Rightarrow \alpha = \frac{1}{\gamma_0} - \frac{1}{\gamma_R} \quad (18)$$

where if it is assumed that $\gamma_R > \gamma_0$, $\alpha$ is positive. In this case, substitution of Equation (18) into Equation (13) leads to Equation (19):

$$R_1 = \log_2\left(\frac{\gamma_0}{\gamma_R}+\gamma_0\right); \quad R_2 = \log_2\left(\frac{\gamma_R}{\gamma_0}\right) \quad (19)$$
$$R_1+R_2 = \log_2(1+\gamma_R), \quad R_{s2} = \log_2(1+\gamma_2)$$

Then the overall rate for the MUS scheme is given by Equation (20):

$$R_{MUS} = \frac{\log_2(1+\gamma_R)}{1+\frac{\log_2\left(\frac{\gamma_R}{\gamma_0}\right)}{\log_2(1+\gamma_2)}} \quad (20)$$

In FIG. 5, two groups of curves are illustrated, one having $\gamma_{21}=\gamma_{22}=2\gamma_0$ and the other having $\gamma_{21}=\gamma_{22}=\gamma_R=30$ dB. When $\gamma_{21}$ and $\gamma_{22}$ are fixed, it is noted that the MUS scheme of the present invention with $R_{MUS}$ is superior to the two other conventional methods with $R_{conv}$ and $R_{srd2}$ and the improvement becomes better when $\gamma_0$ increases. Also, the increase of the value of $\gamma_2$ makes the improvement brought by the MUS more significant. The two curves for $R_{MUS}$ converge at $\gamma_0=30$ dB, although the curves have different values $\gamma_2$ at this point. This is explained by the fact that when $\gamma_0=\gamma_R$, the data for $MS_2$ does not exist i.e. $D_2=0$.

Figure 6:
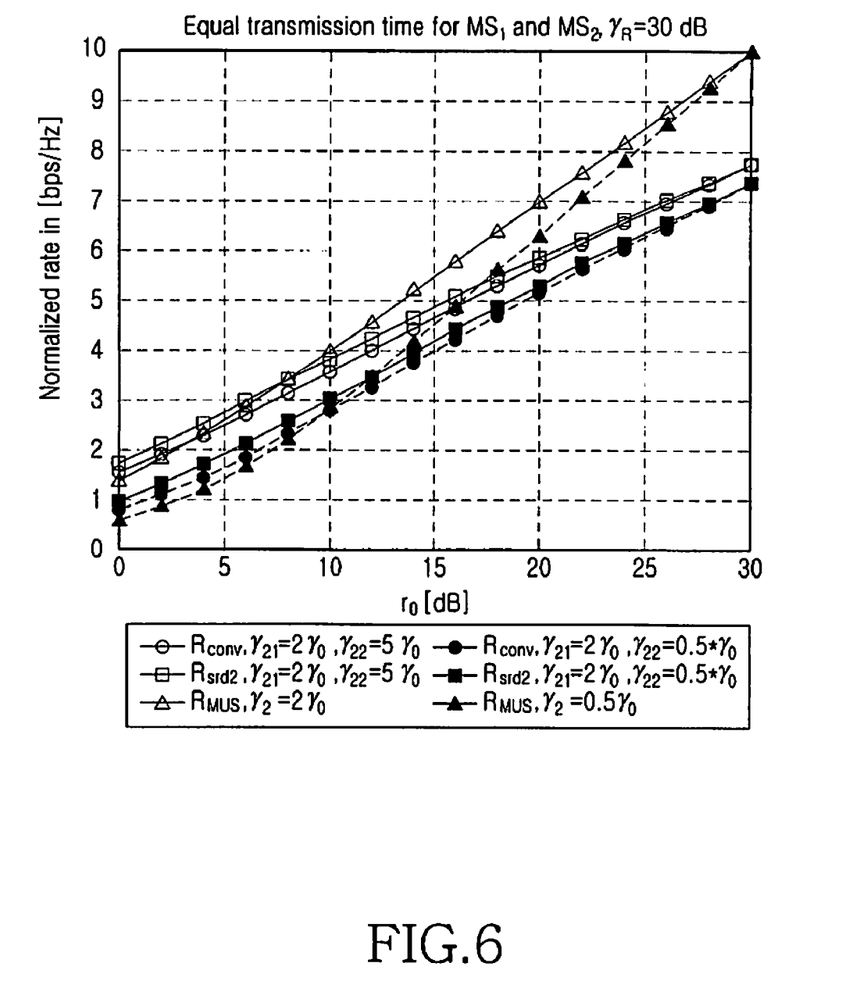

FIG. 6 is another graph comparing the present invention with the conventional methods in communication performance expressed as normalized rates, when equal time resources are allocated to two MSs and $\gamma_{21} \neq \gamma_{22}$. For each of the present invention and the conventional methods, two curves are illustrated for the two cases of $\gamma_{21}=\gamma_2=2\gamma_0$, $\gamma_{22}=5\gamma_0$ and $\gamma_{21}=2\gamma_0$, $\gamma_{22}=\gamma_2=0.5*\gamma_0$. As noted from FIG. 6, the transmission rate $R_{MUS}$ of the present invention is beneficial in terms of improving fairness between two users.

Figure 7:
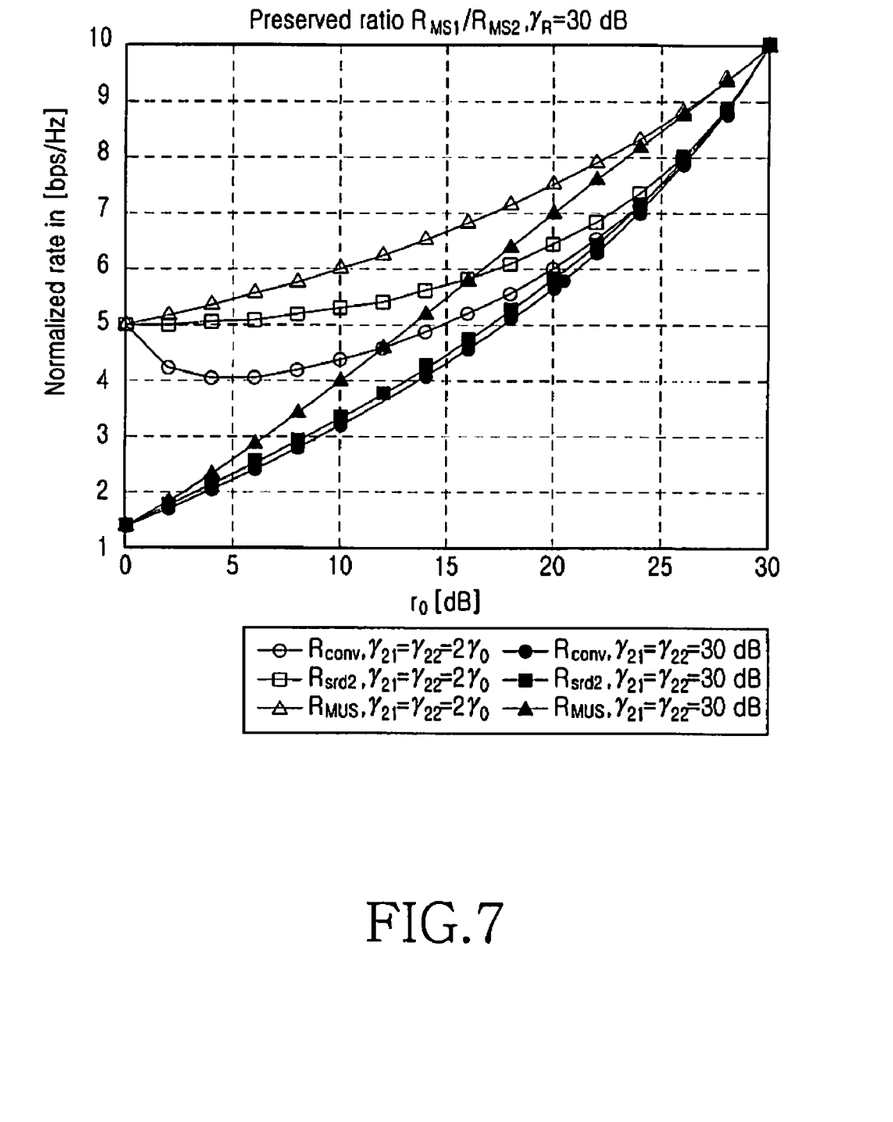
FIGS. 7 and 8 are graphs comparing the present invention with the conventional methods in communication performance, when transmission rates are allocated at a predetermined ratio to two MSs.

FIG. 7 is a graph comparing the present invention with the conventional methods in communication performance expressed as normalized rates, when a transmission rates are allocated at a predetermined ratio to two MSs. Two groups of curves are illustrated, one having $\gamma_{21}=\gamma_{22}=2\gamma_0$ and the other having $\gamma_{21}=\gamma_{22}=\gamma_R=30$ dB.

The numbers of information bits intended for $MS_1$ and $MS_2$ are $D_1$ and $D_2$, respectively, and the transmission rates for the MSs should be determined by finding the time that is needed to transfer the data to them. $D_1$ and $D_2$ are computed by Equation (21):

$$D_1 = N_1 \log_2\left(\frac{\gamma_0}{\gamma_R} + \gamma_0\right); \quad D_2 = N_1 \log_2\left(\frac{\gamma_R}{\gamma_0}\right); \quad \alpha = \frac{1}{\gamma_0} - \frac{1}{\gamma_R} \quad (21)$$

The total symbol duration consumed to send the data is shown in Equation (22):

$$N_1 + N_2, \quad (22)$$

where $$N_2 = \frac{D_2}{\log_2(1+\gamma_2)}$$

Then the ratio between the transmission rate $R_{MS1}$ for $MS_1$ and the transmission rate $R_{MS2}$ for $MS_2$ is computed by Equation (23):

$$\frac{R_{MS1}}{R_{MS2}} = \frac{\log_2\left(\frac{\gamma_0}{\gamma_G}+\gamma_0\right)}{\log_2\left(\frac{\gamma_R}{\gamma_0}\right)} \quad (23)$$

The BS now determines the numbers of transmission symbols that are needed to transfer the information bits $D_1$ and $D_2$ by direct transmission to $MS_1$ and multi-hop transmission to $MS_2$. The number of symbols needed for the direct transmission, shown in Equation (24), is $M_1$ where $$M_1 = N_1 \frac{\log_2\left(\frac{\gamma_0}{\gamma_R}+\gamma_0\right)}{\log_2(1+\gamma_0)} \quad (24)$$

On the other hand, the number of symbols consumed by the multi-hop transmission to send $D_2$ bits to $MS_2$ is shown in Equation (25):

$$M_2 = N_1\left(\frac{\log_2\left(\frac{\gamma_R}{\gamma_0}\right)}{\log_2(1+\gamma_R)} + \frac{\log_2\left(\frac{\gamma_R}{\gamma_0}\right)}{\log_2(1+\gamma_{22})}\right) \quad (25)$$

FIG. 7 shows that the MUS scheme of the present invention with $R_{MUS}$ is superior to the two other conventional methods with $R_{conv'}$ and $R_{srd2'}$, when the ratio between the transmission rates of the two MSs is preset.

Figure 8:
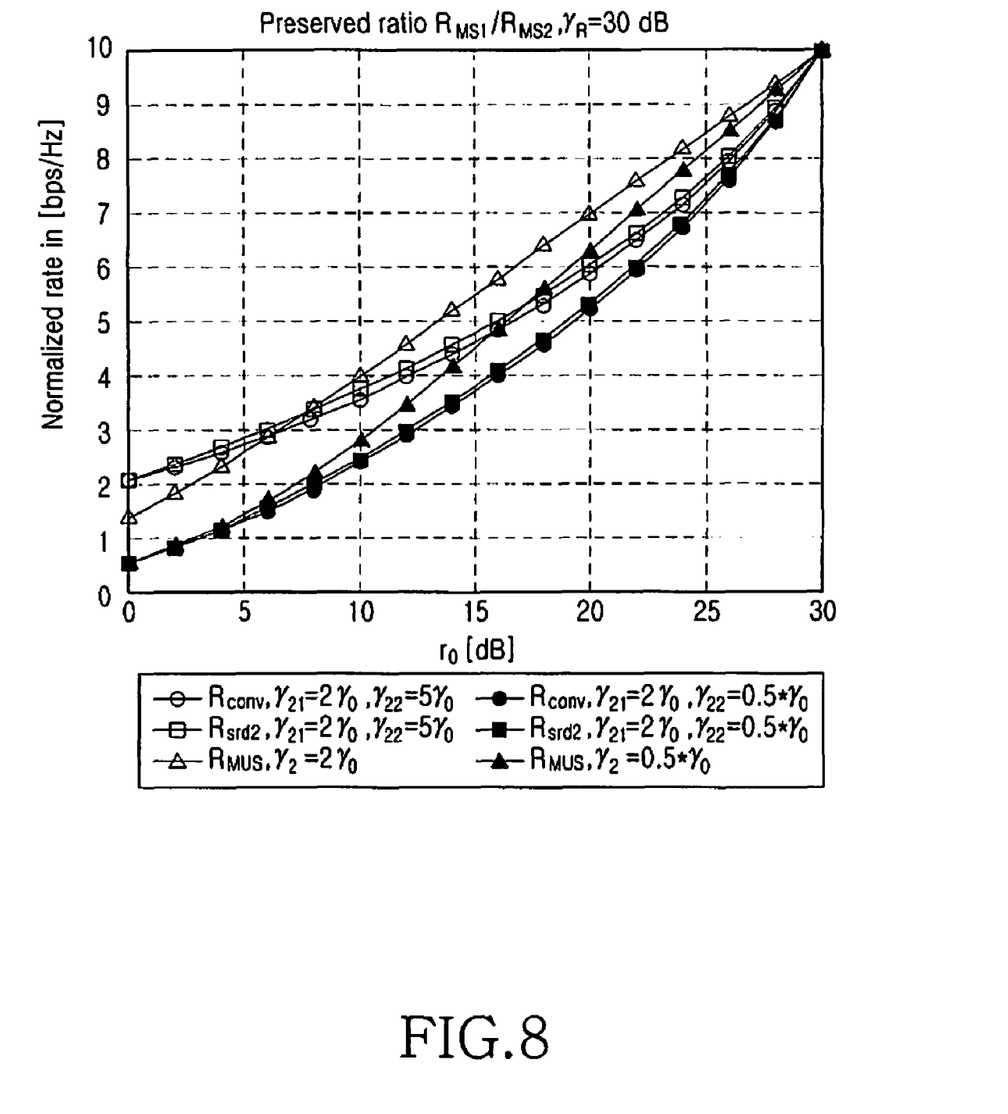

FIG. 8 is another graph comparing the present invention with the conventional methods in communication performance expressed as normalized rates, when a transmission rates are allocated at a predetermined ratio to two MSs and $\gamma_{21} \ne \gamma_{22}$. For each of the present invention and the conventional methods, two curves are illustrated for the two cases of $\gamma_{21}=\gamma_2=2\gamma_0$, $\gamma_{22}=5\gamma_0$ and $\gamma_{21}=2\gamma_0$, $\gamma_{22}=\gamma_2=0.5*\gamma_0$. As noted from FIG. 8, even when $\gamma_{21} \ne \gamma_{22}$, the transmission rate $R_{MUS}$ of the present invention offers much higher gains than in the conventional methods, as far as $\gamma_0$ is sufficiently high.

Figure 9:
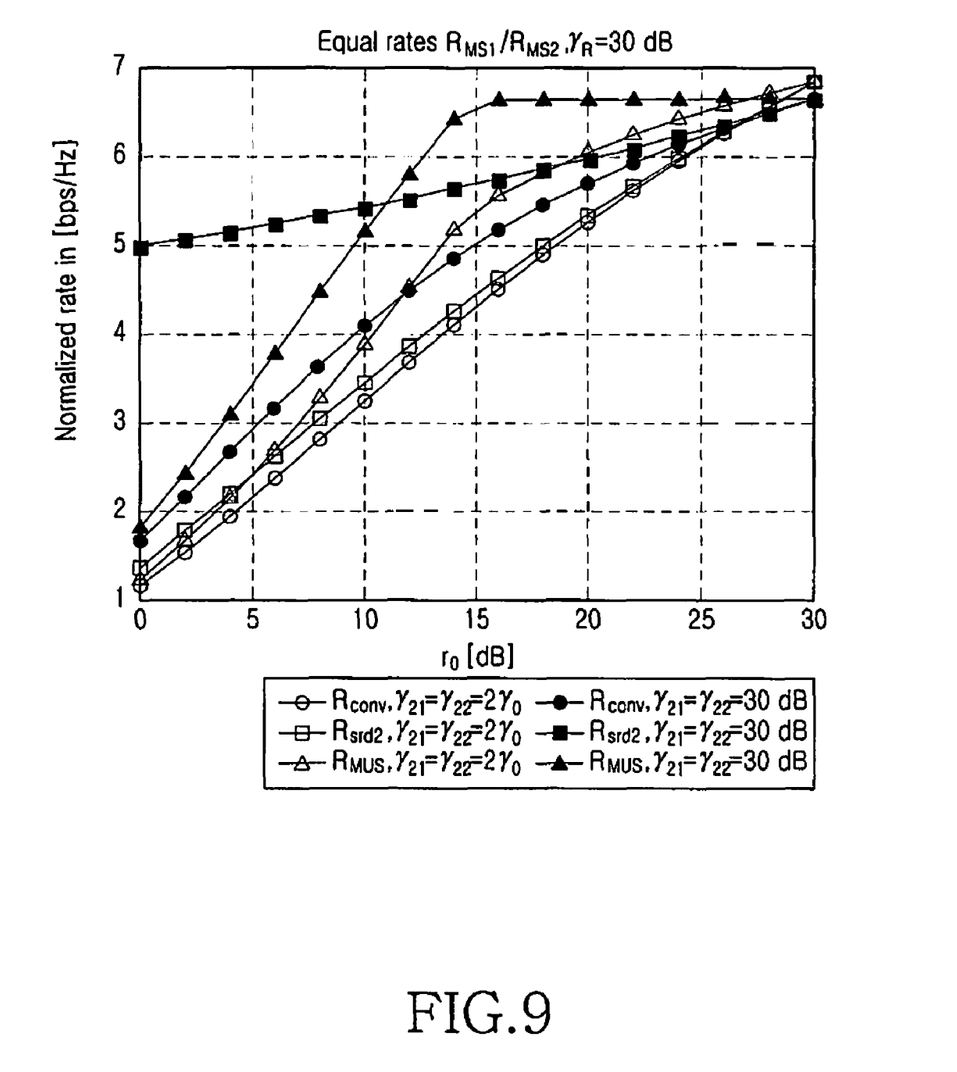
FIGS. 9 and 10 are graphs comparing the present invention with the conventional methods in communication performance, when equal transmission rates are allocated to two MSs.

FIG. 9 is a graph comparing the present invention with the conventional methods in communication performance expressed as normalized rates, when equal transmission rates are allocated to two MSs. Two different cases, Case 1 and Case 2 are considered herein. Case 1 satisfies Equation (26):

$$\gamma_0 > \frac{\gamma_R}{\sqrt{1+\gamma_R}} \quad (26)$$

In this case, the coefficient $\alpha$ is selected according to Equation (27) such that the basic and the superposition-coded stream from the BS have equal rates. This means that, after the transmission of the RS, both $MS_1$ and $MS_2$ should be able to receive the same amount of data over the same time.

$$\frac{(1-\alpha)\gamma_R}{1+\alpha\gamma_R} = \alpha\gamma_R, \quad \alpha = \frac{\sqrt{1+\gamma_R}-1}{\gamma_R} \quad (27)$$

With such a choice of $\alpha$, the message $X_1$ can be decoded by $MS_1$ after the transmission of the RS, since the following condition is satisfied in Equation (28):

$$\text{if } \gamma_0 > \frac{\gamma_R}{\sqrt{1+\gamma_R}}, \text{ then } (1-\alpha)\gamma_0 > \frac{(1-\alpha)\gamma_R}{1+\alpha\gamma_R} \quad (28)$$

As a consequence, the overall rate achieved by the MUS scheme is found to be $$R_{MUS} = \frac{\log_2(1+\gamma_R)}{1+\frac{\log_2(1+\alpha\gamma_R)}{\log_2(1+\gamma_2)}} = \frac{\log_2(1+\gamma_R)}{1+\frac{1}{2}\frac{\log_2(1+\gamma_R)}{\log_2(1+\gamma_2)}} \quad (29)$$

Case 2 satisfies Equation (30):

$$\gamma_0 \le \frac{\gamma_R}{\sqrt{1+\gamma_R}} \quad (30)$$

In this case, the coefficient $\alpha$ is selected according to Equation (31):

$$(1-\alpha)\gamma_0 = \alpha\gamma_R, \quad \alpha = \gamma_0/\gamma_0+\gamma_R \quad (31)$$

The amount of data decoded by MS1 after Step 1 and Step 2 is equal to that amount of data that RS decodes for $MS_2$ in Step 1. After RS forwards that data to $MS_2$ and $MS_1$, both MSs extract exactly the same amount of data, thus achieving equal rates after the two steps of the present invention. Under the condition of Equation (30), the RS can easily decode the message $X_1$ intended for $MS_1$ received from the BS. As a consequence, the overall rate achieved by the MUS scheme is found in Equation (32) to be $$R_{MUS}=2 \log_2(1+\gamma_0)/1+\log_2(1+\alpha\gamma_R)/\log_2(1+\gamma_2) \quad (32)$$

In the scenarios of FIG. 9, since the transmission rates $R_{MS1}$ and $R_{MS2}$ of MS1 and MS2 are equal, Equation (33) is satisfied:

$$R_{MS1}=R_{MS2}=1/2R_{MUS} \quad (33)$$

Under the condition of Equation (33), the number $N_1$ of symbols transmittable to $MS_1$ via the direct link from the BS and the number $N_2$ of symbols transmittable to $MS_2$ via the RS are placed in the relationship of Equation (34):

$$N_1 \log_2(1+\gamma_0)=N_2 \log_2(1+\gamma_R)\cdot\log_2(1+\gamma_{22})/\log_2(1+\gamma_2)+ \log_2(1+\gamma_R) \quad (34)$$

Referring to FIG. 9, two groups of curves are illustrated, one having $\gamma_{21}=\gamma_{22}=2\gamma_0$ and the other having $\gamma_{21}=\gamma_{22}=\gamma_R=30$ dB. As noted from the curves, there are significant regions of $\gamma_0$ where the MUS scheme offers higher rates.

Figure 10:
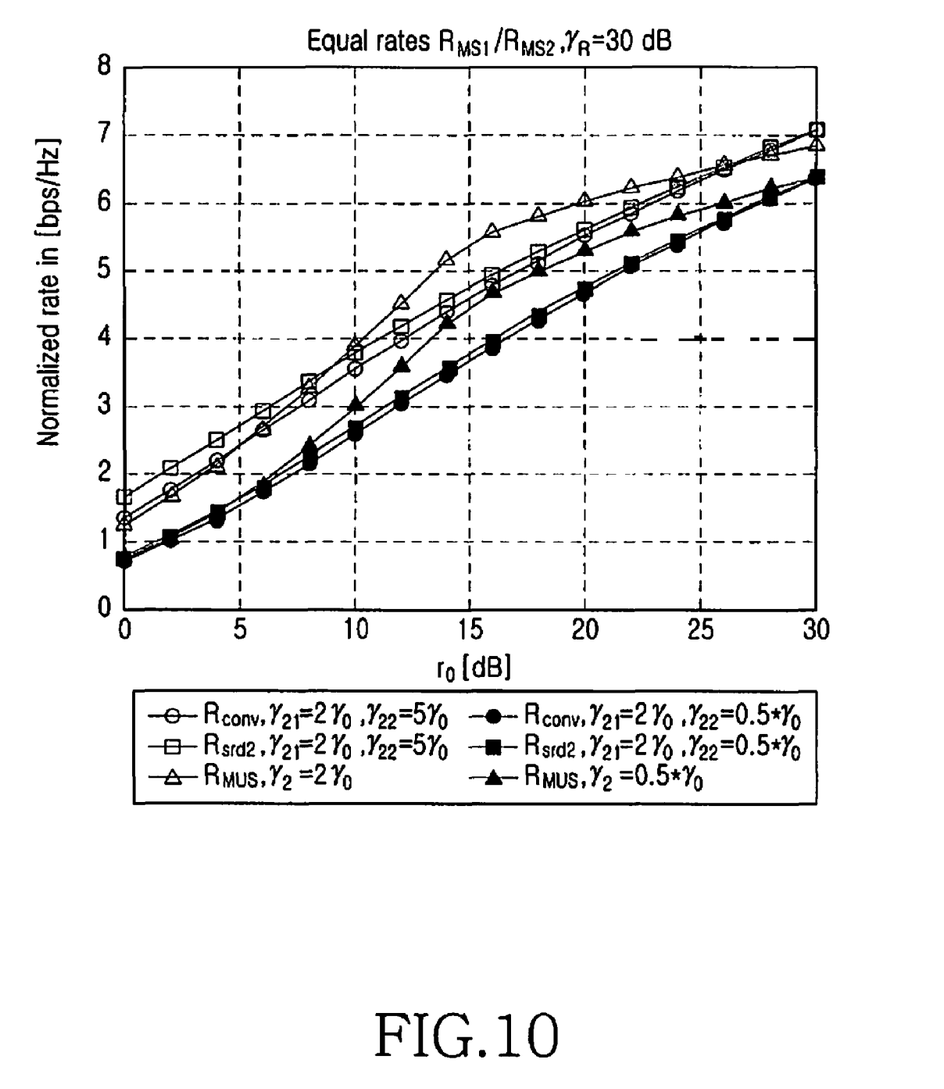

FIG. 10 is another graph comparing the present invention with the conventional methods in communication performance expressed as normalized rates, when equal transmission rates are allocated to two MSs. For each of the present invention and the conventional methods, two curves are illustrated for the two cases of $\gamma_{21}=\gamma_2=2\gamma_0$, $\gamma_{22}=5\gamma_0$ and $\gamma_{21}=2\gamma_0$, $\gamma_{22}=\gamma_2=0.5*\gamma_0$. As noted from FIG. 10, the MUS scheme of the present invention with the transmission rate $R_{MUS}$ relatively outperforms the conventional methods with the transmission rates $R_{conv}$ and $R_{srd2}$.

A description will now be made of exemplary operations based on the MUS scheme according to the embodiment of the present invention. It is assumed that the BS schedules the users according to some criterion i.e. proportional fairness or maximal rate.

In a first operation, the BS decides to serve $MS_i$ over a direct link with $\gamma_{0i}$. Then the BS attempts to find $MS_j$ such that Equation (35) is satisfied $$\gamma_{2j} = \min_{k\neq i}|\gamma_{2k} - \gamma_{2i}| \quad (35)$$

After identifying $MS_j$, the BS determines whether there is a rate improvement if the MUS scheme is applied for $MS_i$ and $MS_j$. If the rate improvement can be achieved, the BS transmits data to the two MSs according to the MUS scheme by tuning the coefficient $\alpha$ so as to satisfy a predetermined rate criterion.

In a second operation, the BS decides to serve $MS_i$ over a multi-hop link. Then, the BS attempts to find $MS_j$ that has $\gamma_{2j}$ close to $\gamma_{2i}$, but also a very good link $\gamma_{0j}$. $\gamma_{2i}$ is the SNR of the multi-hop link to $MS_i$ and $\gamma_{2j}$ is the SNR of the multi-hop link to $MS_j$. In case there are several candidates $\{j\}$, then the BS can calculate the rates achievable for each user $\{j\}$. If there is a user candidate $\{j\}$ having a maximal rate than a predetermined transmission rate, the BS sends data to the user by using the MUS scheme.

Now a description will be made of the case where there are K users in the system and the system throughput should be maximized. At each scheduling instant, the BS calculates a rate achieved by scheduling a user pair $MS_i$ and $MS_j$. Here it calculates the overall rates of the MSU scheme and other transmission schemes. Finally, the BS selects a transmission scheme and a pair of users or a single user that maximize the overall rate and transmits data to the selected user pair or single user in the selected transmission scheme.

As is apparent from the above description, the present invention advantageously improves communication quality and increases data throughput by providing a multi-hop link via an RS between a BS and an MS in addition to a good direct link between them, if possible.

While the invention has been shown and described with reference to certain preferred embodiments of the present invention thereof, it will be understood by those skilled in the art that various changes in form and details may be made therein without departing from the spirit and scope of the present invention as defined by the appended claims and their equivalents.

What is claimed is:

1. A method for transmitting data via a Relay Station (RS) in a wireless relay system, comprising the steps of:
    encoding a first data message and a second data message directed to a first Mobile Station (MS) and a second MS scheduled at a current scheduling instant by superposition coding by a Base Station (BS), the first data message carrying a first information bit stream for the first MS, the second data message carrying a second information bit stream for the second MS, the first MS having a relatively good direct link to the BS, and the second MS having a relatively bad direct link to the BS;
    transmitting the superposition-coded data to the first MS and the RS connected between the BS and the first and second MSs by the BS;
    receiving the superposition-coded data from the BS;
    extracting the second information bit stream for the second MS by decoding the superposition-coded data; and
    transmitting a third data message carrying the second information bit stream to the first and second MSs by the RS.

2. The method of claim 1, wherein the BS generates the superposition-coded data using a given coefficient for the first and second MSs by:

$$\sqrt{1-\alpha}X_1+\sqrt{\alpha}X_2, 0\leq\alpha\leq 1,$$

where $\alpha$ is the given coefficient and $X_1$ and $X_2$ are the first and second data messages, respectively.

3. The method of claim 1, further comprising determining transmission rates for the first and second messages using a given coefficient for the first and second MSs by:

$$R_1=\log_2(1+(1-\alpha)\gamma_0)$$

$$R_2=\log_2(1+\alpha\gamma_R),$$

where $\alpha$ is the given coefficient between 0 and 1, $R_1$ and $R_2$ are the transmission rates of the messages $X_1$ and $X_2$, $\gamma_0$ is a Signal-to-Noise Ratio (SNR) of the direct link between the BS and the first MS, and $\gamma_R$ is an SNR of a link between the BS and the RS.

4. The method of claim 3, further comprising:
    calculating overall rates for all MS pairs of MSs served by the BS using the transmission rates at the scheduling instant by:

$$r_1 = \frac{\log_2(1+(1-\alpha)\gamma_0)}{1+\frac{\log_2(1+\alpha\gamma_R)}{\log_2(1+\gamma_2)}}$$

$$r_2 = \frac{\log_2(1+\alpha\gamma_R)}{1+\frac{\log_2(1+\alpha\gamma_R)}{\log_2(1+\gamma_2)}}$$

where $r_1$ and $r_2$ are the overall rates of two MSs of each of the user pairs;
calculating a scheduling gain for the overall rates of the each user pair by a predetermined scheduling algorithm; and
determining to transmit data to a user pair having a maximal scheduling gain among all user pairs.

5. The method of claim 1, further comprising:
calculating transmission rates for data messages directed to two MSs of each of all MS pairs of MSs served by the BS using a given coefficient for the each user pair; and
calculating the number of bits for each of the first and second information bit streams according to the transmission rates and the number of transmission symbols used by the BS at the scheduling instant by:

$$D_1 = NR_1$$

$$D_2 = NR_2$$

where $D_1$ is the number of bits for the first information bit stream, $D_2$ is the number of bits for the second information bit stream, N is the number of transmission symbols used by the BS, and $R_1$ and $R_2$ are the transmission rates of the data messages.

6. The method of claim 1, further comprising determining the number of transmission symbols and a transmission rate for the third data message by:

$$R_{s2} = \log_2(1 + \gamma_2)$$

$$M = \frac{D_2}{\log_2(1 + \gamma_2)}$$

where $R_{s2}$ is the transmission rate of the third data message, M is the number of transmission symbols to be used for the third data message, $\gamma_2$ is a smaller SNR between the SNRs of links between the RS and the first and second MSs, and $D_2$ is the number of bits for the second information bit stream.

7. A method for receiving data via a Relay Station (RS) in a wireless relay system, comprising the steps of:
receiving superposition-coded data including a first data message and a second data message by a first Mobile Station (MS) scheduled along with a second MS at a current scheduling instant by a Base Station (BS), the first data message carrying a first information bit stream for the first MS, the second data message carrying a second information bit stream for the second MS, the first MS having a relatively good direct link to the BS, and the second MS having a relatively bad direct link to the BS;
receiving a third data message carrying the second information bit stream directed to the second MS from the RS connected between the BS and the first and second MSs;
extracting the second information bit stream by decoding the third data message by the first MS; and
acquiring the first data message by removing components related to the second information bit stream from the superposition-coded data and extracting the first information bit stream by decoding the first data message by the first MS.

8. The method of claim 7, wherein the superposition-coded data is formed using a given coefficient for the first and second MSs by:

$$\sqrt{1-\alpha}X_1 + \sqrt{\alpha}X_2, \ 0 \leq \alpha \leq 1$$

where $\alpha$ is the given coefficient and $X_1$ and $X_2$ are the first and second data messages, respectively.

9. The method of claim 7, wherein the first data message is acquired using a given coefficient for the first and second MSs, by:

$$\gamma_{12} = \gamma_{11} - h_0\sqrt{\alpha}X_2 = h_0\sqrt{1-\alpha}X_1 + z_{11}$$

where $\gamma_{12}$ is data including the first data message, $\gamma_{11}$ is the superposition-coded data, $\alpha$ is the given coefficient, $X_1$ and $X_2$ are the first and second data messages, respectively, $h_0$ is a channel impulse response representing channel characteristics of the direct link between the BS and the first MS, and $z_{11}$ is noise.

10. The method of claim 7, wherein transmission rates of the first and second messages are determined using a given coefficient for the first and second MSs by:

$$R_1 = \log_2(1 + (1-\alpha)\gamma_0)$$

$$R_2 = \log_2(1 + \alpha\gamma_R)$$

where $\alpha$ is the given coefficient between 0 and 1, $R_1$ and $R_2$ are the transmission rates of the messages $X_1$ and $X_2$, $\gamma_0$ is a Signal-to-Noise Ratio (SNR) of the direct link between the BS and the first MS, and $\gamma_R$ is an SNR of a link between the BS and the RS.

11. The method of claim 7, wherein the number of bits for each of the first and second information bit streams is determined according to transmission rates of the first and second data messages and the number of transmission symbols used by the BS at the scheduling instant, by:

$$D_1 = NR_1$$

$$D_2 = NR_2$$

where $D_1$ is the number of bits for the first information bit stream, $D_2$ is the number of bits for the second information bit stream, N is the number of transmission symbols used by the BS, and $R_1$ and $R_2$ are the transmission rates of the data messages.

12. The method of claim 7, wherein the number of transmission symbols and a transmission rate for the third data message are determined by:

$$R_{s2} = \log_2(1 + \gamma_2)$$

$$M = \frac{D_2}{\log_2(1 + \gamma_2)}$$

where $R_{s2}$ is the transmission rate of the third data message, M is the number of transmission symbols to be used for the third data message, $\gamma_2$ is a smaller SNR between the SNRs of links between the RS and the first and second MSs, and $D_2$ is the number of bits for the second information bit stream.

13. The method of claim 7, further comprising receiving the third data message and extracting the second information bit stream by decoding the third data message by the second MS.

14. An apparatus for transmitting and receiving data via a Relay Station (RS) in a wireless relay system, comprising:
a Base Station (BS) for encoding a first data message and a second data message directed to a first Mobile Station (MS) and a second MS, scheduled at a current scheduling instant by superposition coding, the first data message carrying a first information bit stream for the first MS, the second data message carrying a second information bit stream for the second MS, and the second MS having a relatively bad direct link to the BS, and transmitting the superposition-coded data; and the RS connected between the BS and the first and second MSs, for establishing multi-hop links, receiving the superposition-coded data from the BS, extracting the second information bit stream for the second MS by decoding the superposition-coded data, and transmitting a third data message carrying the second information bit stream to the first and second MSs, wherein the first MS receives the superposition-coded data from the BS, receiving the third data message from the RS, extracting the second information bit stream by decoding the third data message, acquiring the first data message by removing components related to the second information bit stream from the superposition-coded data, and extracting the first information bit stream by decoding the first data message.

15. The apparatus of claim 14, wherein the superposition-coded data is formed using a given coefficient for the first and second MSs by:

$$\sqrt{1-\alpha}X_1 + \sqrt{\alpha}X_2, \ 0 \leq \alpha \leq 1$$

where $\alpha$ is the given coefficient and $X_1$ and $X_2$ are the first and second data messages, respectively.

16. The apparatus of claim 14, wherein transmission rates of the first and second messages are determined using a given coefficient for the first and second MSs by:

$$R_1 = \log_2(1+(1-\alpha)\gamma_0)$$

$$R_2 = \log_2(1+\alpha\gamma_R)$$

where $\alpha$ is the given coefficient between 0 and 1, $R_1$ and $R_2$ are the transmission rates of the messages $X_1$ and $X_2$, $\gamma_0$ is a Signal-to-Noise Ratio (SNR) of the direct link between the BS and the first MS, and $\gamma_R$ is an SNR of a link between the BS and the RS.

17. The apparatus of claim 16, wherein the BS calculates overall rates for all MS pairs of MSs served by the BS using the transmission rates at the scheduling instant by:

$$r_1 = \frac{\log_2(1+(1-\alpha)\gamma_0)}{1+\frac{\log_2(1+\alpha\gamma_R)}{\log_2(1+\gamma_2)}}$$

$$r_2 = \frac{\log_2(1+\alpha\gamma_R)}{1+\frac{\log_2(1+\alpha\gamma_R)}{\log_2(1+\gamma_2)}}$$

where $r_1$ and $r_2$ are the overall rates of two MSs of each of the user pairs, calculates a scheduling gain for the overall rates of the each user pair by a predetermined scheduling algorithm, and determines to transmit data to a user pair having a maximal scheduling gain among all user pairs.

18. The apparatus of claim 14, wherein the number of bits for each of the first and second information bit streams are calculated according to the transmission rates and the number of transmission symbols used by the BS at the scheduling instant by:

$$D_1 = NR_1$$

$$D_2 = NR_2$$

where $D_1$ is the number of bits for the first information bit stream, $D_2$ is the number of bits for the second information bit stream, N is the number of transmission symbols used by the BS, and $R_1$ and $R_2$ are the transmission rates of the data messages.

19. The apparatus of claim 14, wherein the number of transmission symbols and a transmission rate for the third data message are determined by:

$$R_{s2} = \log_2(1+\gamma_2)$$

$$M = \frac{D_2}{\log_2(1+\gamma_2)}$$

where $R_{s2}$ is the transmission rate of the third data message, M is the number of transmission symbols to be used for the third data message, $\gamma_2$ is a smaller SNR between the SNRs of links between the RS and the first and second MSs, and $D_2$ is the number of bits for the second information bit stream.

20. The apparatus of claim 14, wherein the first MS acquires the first data message using a given coefficient for the first and second MSs, by:

$$\gamma_{12} = \gamma_{11} - h_0\sqrt{\alpha}X_2 = h_0\sqrt{1-\alpha}X_1 + z_{11}$$

where $\gamma_{12}$ is data including the first data message, $\gamma_{11}$ is the superposition-coded data, $\alpha$ is the given coefficient, $X_1$ and $X_2$ are the first and second data messages, respectively, $h_0$ is a channel impulse response representing channel characteristics of the direct link between the BS and the first MS, and $z_{11}$ is noise.

21. The apparatus of claim 14, wherein the second MS receives the third data message and extracting the second information bit stream by decoding the third data message.

* * * * *